United States Patent [19]

Schublom

[11] Patent Number: 4,805,338
[45] Date of Patent: Feb. 21, 1989

[54] FISHING MITT

[76] Inventor: Gerald G. Schublom, P.O. Box 6473, Duluth, Minn. 55806

[21] Appl. No.: 222,891

[22] Filed: Jul. 22, 1988

[51] Int. Cl.$^4$ .............................................. A01K 97/00
[52] U.S. Cl. ......................................... 43/25; 2/161 A
[58] Field of Search ............... 2/16, 17, 161 A; 43/25, 43/26, 53.5, 18.1

[56] References Cited

U.S. PATENT DOCUMENTS

| | | | |
|---|---|---|---|
| 2,869,277 | 1/1959 | Breithaupt | 43/26 |
| 2,997,042 | 8/1961 | Mitchell | 43/25 |
| 4,213,205 | 7/1980 | Smith | 2/161 A |
| 4,488,313 | 12/1984 | Delaney | 2/17 |
| 4,564,956 | 1/1986 | DiBuono | 2/16 |
| 4,641,454 | 2/1987 | Ray | 43/26 |
| 4,683,592 | 8/1987 | Strongwater | 2/17 |
| 4,727,675 | 3/1988 | Huntt | 43/25 |

Primary Examiner—M. Jordan
Attorney, Agent, or Firm—Orrin M. Haugen; Thomas J. Nikolai; Frederick W. Niebuhr

[57] ABSTRACT

An improved fishing mitt comprised of a main body and a double cuff is disclosed. The main body includes eight separate layers for warmth. The main body also has two adjoining break-apart edges so that the mitt can be peeled back over the forearm to expose the hand when landing a fish.

9 Claims, 1 Drawing Sheet

FISHING MITT

FIELD OF THE INVENTION

The present invention relates to a mitt to be worn over the hand while fishing. More particularly, the present invention which is worn while fishing during cold weather which insulates the hand from the elements and does not interfere with the proper operation or control of a standard fishing rod and reel. The mitt of the present invention is ideally suited for use in conjunction with a fly rod and a fly reel as well as ice fishing rod and reel combinations.

BACKGROUND OF THE INVENTION

Fishing, as a recreational sport, has grow tremendously in popularity in recent years. Fishing is no longer restricted to the warm summer months. Many fishermen fish year-round. Spring and fall stream fishing is enjoyed by many. This involves, however, in many cases, standing in streams of 33' water with air temperatures of 15° and wind chills making it feel much colder. Similarly, in northern states of the United States, ice fishing has become a very popular winter activity. Sitting in the middle of an ice covered, wind swept lake in below zero weather can be a chilling experience unless one is dressed in proper cold weather gear. While many satisfactory parkas, leggings, boots, hats and facemasks have been developed to protect the ice fishermen from the cold, there is a real need for a glove or mitt to protect the hand from the cold which, at the same time, does not inhibit the fisherman from swiftly and skillfully being able to operate his fishing rod and reel. This is essential if one is to successfully catch steelhead and anadromous fish noted for their subtle bite.

One attempt to develop such a fishing glove or mitt is disclosed in U.S. Pat. No. 4,727,675 issued to Robert L. Huntt on Mar. 1, 1988. This patent describes a mitt intended to surround the hand and forearm of the fisherman as he grips the handle of a fishing pole. The portion of the fishing pole beyond the handle projects through an opening formed in the mitt. The fishing line exits through a special guide clipped to the pole. This guide precludes the mitt from interfering with the line. The reel associated with the fishing pole is also contained in the interior of the mitt. The crank of the reel extends through a special slit formed in the side of the mitt so that it can be turned with the other hand. Given this construction, in all likelihood, only a reel with a very long crank shaft would work satisfactorily with Huntt's glove. It is also likely that this glove will only prove acceptable for use if the relationship between the rod and reel is such that the rod can be comfortably held when the crank of the reel is projecting through the slit. The Huntt glove may not be acceptable for use with many standard rod and reel combinations.

Another effort to develop an acceptable apparatus for keeping the hand warm while fishing is disclosed in U.S. Pat. No. 2,997,042 which issued on Aug. 22, 1961 in the name of James A. Mitchell. The apparatus in Mitchell is comprised of a tubular handle unit which includes an internal burner element. The apparatus also includes a fabric mitt which snugly embraces the handle of the fishing rod as well as the wearer's hand.

An important problem with prior art fishing mitts becomes apparent when one is stream fishing for Steelhead or Salmon. Steelhead, for example, run rivers and streams in a non-feeding phase. When they do bite, they very often hold the bait momentarily in their mouth and then eject it. Steelhead also drift backward in the current when they take the bait. These two factors make it difficult for fishermen to detect a fish on the line. Further, since Steelhead cling to the bottom, often preferring fast water, the fisherman must use adequate weight to tap along the bottom and set the hook when it feels different, soft or out of sync with the rhythm of the bottom. Only the sensitivity of a fly rod makes this possible. It is, therefore, vital that a fishing mitt not unduly interfere with the sensitivity of the rod.

SUMMARY OF THE INVENTION

The present invention is directed to a fishing mitt which can be used in cold or inclement weather to shelter the hand while still permitting the fisherman to maintain the requisite feel for knowing that a fish is playing with or mouthing the bait. This mitt, because of its unique design, does not materially interfere with a fisherman's ability to swiftly and skillfully control the rod and reel.

The mitt of the present invention comprises a double cylindrical knitted cuff which is intended to surround the fisherman's wrist. The mitt, itself, is split along the front and bottom edge. The front and bottom edges can be held together by Velcro type hook and loop material sewn along the opposite edges. Thus, these edges can be joined together to create a sealed enclosure.

In the preferred embodiment, the mitt has an outer, water-resistant shell. This shell should be made of a material which allows the mitt to breath. Within the outer shell is a lining into which one or more layers of insulation are placed to provide the requisite warmth.

When in use, the handle of the fishing rod is within the mitt where it can be gripped by the hand. The rod, itself, projects out through the front seam. The reel is exterior to the mitt so that the mitt does not interfere with the reel's operation as the reel is manipulated with the fisherman's other hand. A tab is present to surround the handle and close air leaks into the mitt. Finally, tabs are provided so that the mitt can be stripped back over the fisherman's forearm to expose the bare hand after the fish is hooked and just as it is being landed.

The described construction provides a light weight mitt which will not create undue arm or shoulder fatigue. The layered nature of the construction also ensures that the mitt will be warm. Finally, the choice of material permits the mitt to be colored as desired.

BRIEF DESCRIPTION OF THE DRAWINGS

The present invention will be understood more readily with reference to the drawings, wherein.

DETAILED DESCRIPTION OF THE INVENTION

Figure 1:
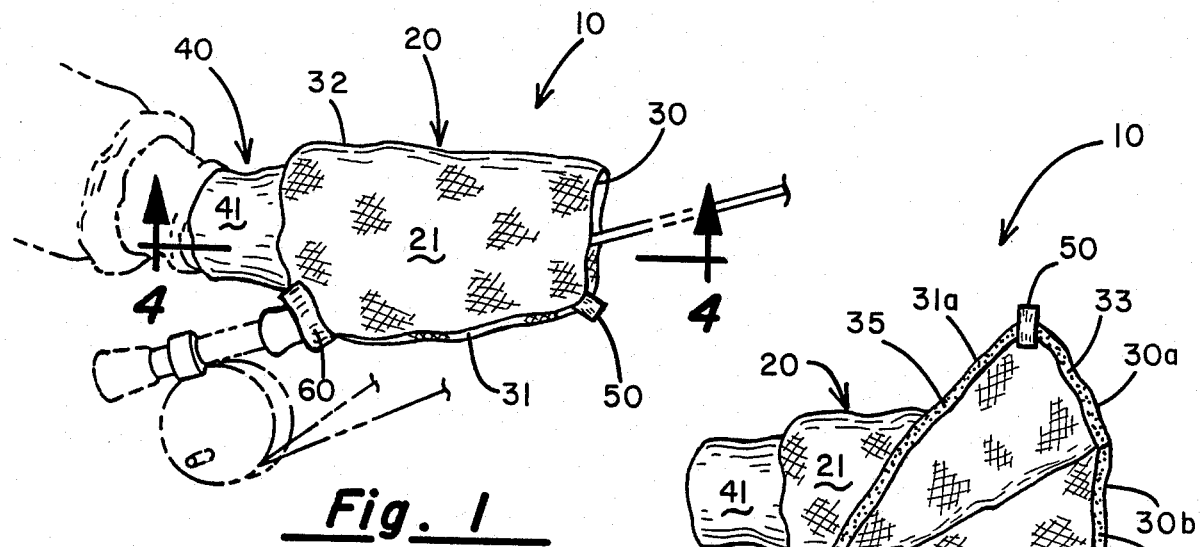
FIG. 1 is a side view of the fishing mitt as worn over the hand which is holding a standard fly fishing rod and reel.

As shown in FIG. 1 through 4, the mitt 10 of the present invention includes a main member 20 which surround the wearer's hand. Attached to the main member 20 is a double cuff 40 comprised of outer cuff member 41 and inner cuff member 42. Both of these cuff members snugly fit around the wearer's wrist.

The main member 20 includes an outer shell 2 which preferably made of a water resistant material that still permits the mitt to breath. One such material is sold under the GORE-TEX trademark. The main member 20 also includes a lining 22 which is adjacent to the shell 21. Adjacent to the lining 22 is one or more layers of insulation 23 which are employed to provide the requisite warmth. A product marketed by Minnesota Mining and Manufacturing under the trademark THINSULATE has proven to be a desirable material to use for insulation 23. On the opposite side of the insulative layer 23 from lining 22 is another layer of lining 24. Linings 22 and 42 form a pocket around the insulation 23. In the preferred embodiment, layers 21–24 are all stitched to the outer cuff member 41.

Stitched to the inner cuff member 42 are, preferably, four more layers of material. These are a lining 25, an insulative layer 26, another lining 27 and, finally, the inner lining 28 of the fishing mitt 10. Superior results have been achieved using the eight layer design described above, particularly when the outer shell is made of GORTEX and when the insulative layers are made of 100 grain THINSULATE. However, a different number of layers and different materials can be used without deviating from the invention.

An important feature of the present invention is that at least two adjoining seams of the main member are fastened together using a hook and loop type closure commonly referred to as Velcro. In the drawings, this is shown as the front seam 30 and the bottom seam 31. Those skilled in the art, however, will recognize that one could construct the mitt without deviating from the invention so that the top seam 32 rather than the bottom seam 31 is a break away seam. Similarly, the top seam 32, the front seam 30 and the bottom seam 31 could all be constructed using hook and loop type closures What is important for warmth is that all of the layers 21–28 be sewn to both sides of the hook and loop type closures. This ensures that the eight layers surround the wearer's hand.

Figure 2:
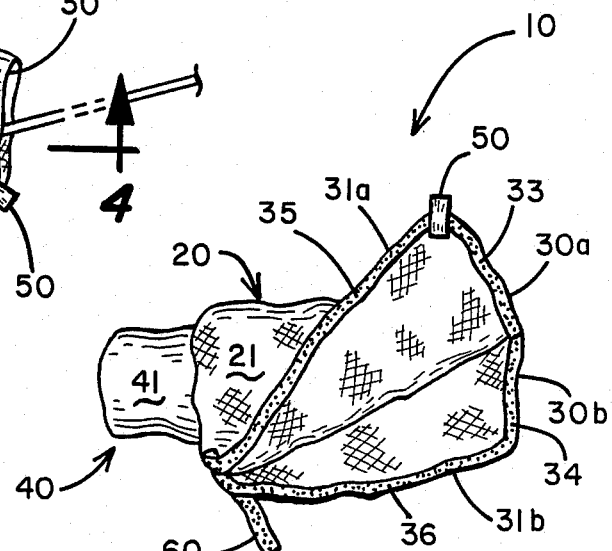
FIG. 2 shows the fishing mitt opened up to expose its construction as assembled.

As best shown in FIG. 2, sewn to the front edge 30a is an elongated pad of hooks 33 and sewn to the front edge 30b is a pad of loops 34. When edge 30a and edge 30b are brought together, the hooks on pad 33 mate with the loops on pad 34 to form "break away" seam 30. "Break away" bottom seam 31 is formed in a similar manner. This time a pad of hooks 35 is sewn to edge 31a and a pad of loops 36 is sewn to edge 31b.

When the mitt 10 is in use, double cuff 40 is slipped over the hand onto the wrist where it forms a tight yet comfortable seal around the wrist. The wearer than grips the handle of his fishing rod and wraps the main portion 20 of the mitt around his hand and the fishing rod. The hook and loop closures described above are used to form the front seam 30 and the bottom seam 31 so that the mitt encloses the hand. The main portion of the rod projects from the mitt through the front seam 30.

Figure 3:
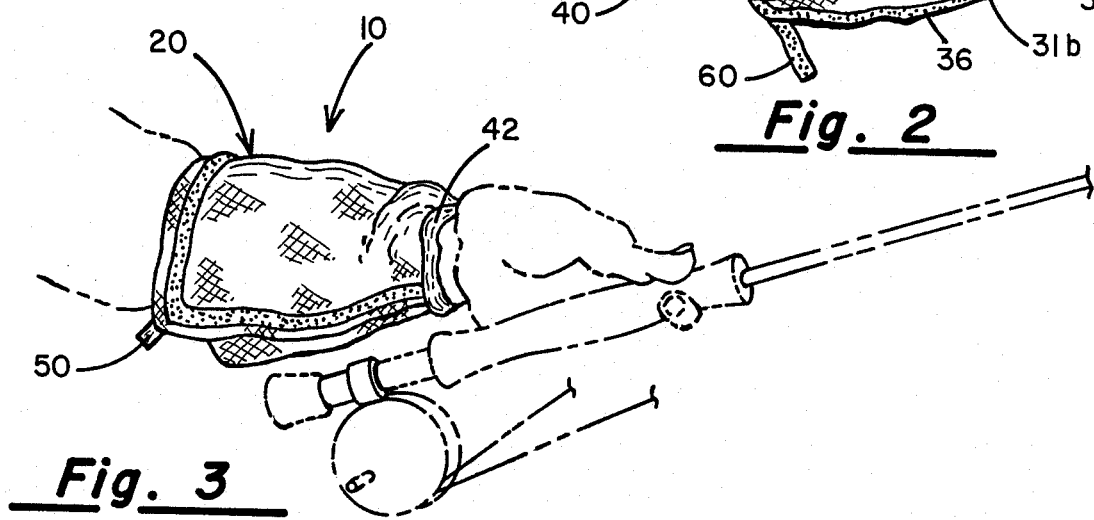
FIG. 3 is a view of the fishing mitt peeled back over the forearm to expose the hand.
Figure 4:
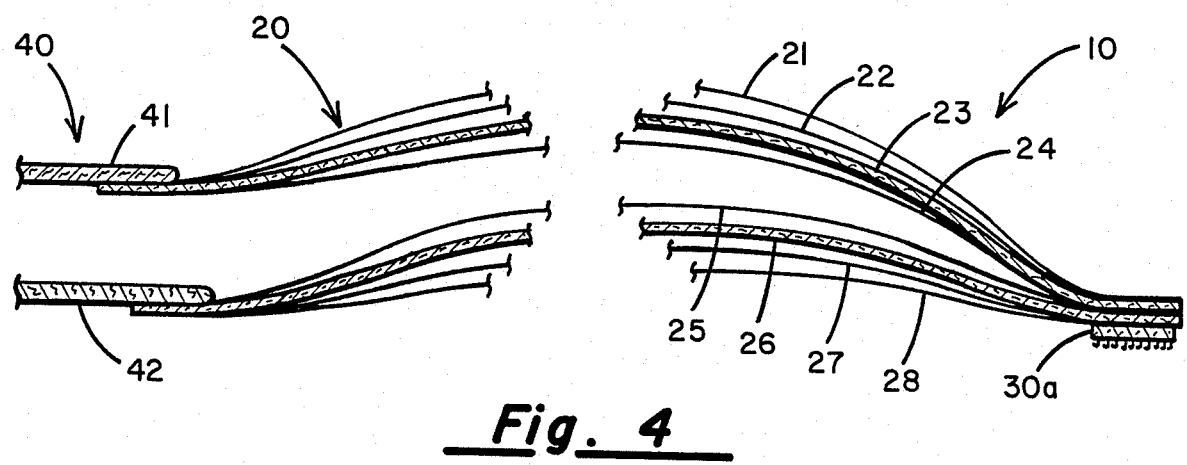
FIG. 4 is a cross-section through Line 4—4 in FIG. 1 to show the various layers of construction of the mitt.

Because another important feature of this invention is to be able to quickly and easily break the seams 30 and 31 and fold the main portion of the mitt 10 back over the wearer's forearm, as shown in FIG. 3, one or more tabs 50 may be stitched to the outer shell 21 in the area near the point where seams 30 and 31 meet. Thus, by pulling on tab 50, both seams can be quickly broken away to expose the hand.

Finally, sewn to the lower section of the mitt near the double cuff 40 is a reinforcing tab 60 which is intended to surround the end of a fly fishing pole to form a tight seal through which air will not leak. Again, hook and loop type closures are used to secure the tab 60 to the mitt.

The above-described embodiment of the fishing mitt is merely illustrative of the present invention and is not intended to be limiting. This description should not be construed as defining the scope of the invention. Since those skilled in the art will recognize that other fishing mitts can be designed which practice the invention, it is the intent of the following claims, rather than this specification, to define the metes and bounds of the invention.

What I claim:

1. A mitt to be worn on the hand while fishing with a rod and reel combination comprising:
   (a) a double cuff portion which fits snugly about the wearer's wrist; and
   (b) a main portion which is attached to the double cuff and is intended to surround the wearer's hand as well as the handle portion of the wearer's fishing pole, said main portion having an outer shell made of a water resistent breathable fabric, an inner lining which forms a pocket, and at least one insulative layer within said pocket, said main portion also including adjoining first and second break away seams so that the main portion can be opened up and folded back over the wearer's forearm exposing the wearer's hand when desire.

2. The mitt of claim 1 wherein said first break away seam is the front seam.

3. The mitt of claim 2 wherein said second break away seam is the bottom seam.

4. The mitt of claim 2 wherein said second break away seam is the top seam.

5. The mitt of claim 1 wherein said first and second break away seams are each formed and held together using hook and loop type closures.

6. The mitt of claim 1 wherein the rod projects though the break away front seam and the reel is attached to the rod at a location outside the mitt.

7. The apparatus of claim 1 further including a tab secured to the main portion of the mitt near the point wear the break away bottom seam meet, the purpose of said tab being to assist the wearer in folding the main portion back over the wearer's forearm.

8. The apparatus of claim 1 further including a tab which surrounds and forms an air tight seal around the end of a fly fishing rod.

9. A mitt to be worn on the hand while fishing with a rod and reel combination comprising:
   (a) a double cuff portion which fits snugly about the wearer's wrist;
   (b) a main portion which is attached to the double cuff and is intended to surround the wearer's hand as well as the handle portion of the wearer's fishing pole, said main portion having an outer shell made of a water resistent breathable fabric, an inner lining which forms a pocket, a plurality of intermediate linings, and a plurality of insulative layers within said pocket, said main portion also including adjoining first and second break away seams so that the main portion can be opened up and folded back over the wearer's forearm exposing the wearer's hand when desired; and
   (c) a tab which surrounds and forms an air tight seal around the end of a fishing rod where it projects from said main portion.

* * * * *